(12) United States Patent
Bose et al.

(10) Patent No.: US 8,527,994 B2
(45) Date of Patent: Sep. 3, 2013

(54) GUARDED, MULTI-METRIC RESOURCE CONTROL FOR SAFE AND EFFICIENT MICROPROCESSOR MANAGEMENT

(75) Inventors: Pradip Bose, Yorktown Heights, NY (US); Alper Buyuktosunoglu, White Plains, NY (US); Niti Madan, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 13/024,781

(22) Filed: Feb. 10, 2011

(65) Prior Publication Data

US 2012/0210328 A1 Aug. 16, 2012

(51) Int. Cl.
*G06F 9/46* (2006.01)

(52) U.S. Cl.
USPC ............................................ 718/100; 713/300

(58) Field of Classification Search
None
See application file for complete search history.

(56) References Cited

U.S. PATENT DOCUMENTS

| | | | |
|---|---|---|---|
| 5,682,273 A | 10/1997 | Hetzler | |
| 5,954,820 A | 9/1999 | Hetzler | |
| 7,134,028 B2 | 11/2006 | Bose et al. | |
| 7,183,825 B2 | 2/2007 | Padhye et al. | |
| 7,380,147 B1 | 5/2008 | Sun | |
| 7,421,601 B2 | 9/2008 | Bose et al. | |
| 7,516,346 B2 | 4/2009 | Pinheiro et al. | |
| 7,856,563 B1 | 12/2010 | Sade et al. | |
| 2003/0105983 A1 | 6/2003 | Brakmo et al. | |
| 2005/0120256 A1 | 6/2005 | Lu | |
| 2005/0174159 A1 | 8/2005 | Rozen et al. | |
| 2006/0005053 A1 | 1/2006 | Jones, Jr. et al. | |
| 2006/0184287 A1 | 8/2006 | Belady et al. | |
| 2006/0259791 A1 | 11/2006 | Dockser | |
| 2007/0300083 A1 | 12/2007 | Goodrum et al. | |
| 2008/0027664 A1* | 1/2008 | Bose et al. | 702/60 |
| 2008/0082753 A1 | 4/2008 | Licht et al. | |
| 2008/0133886 A1* | 6/2008 | Bose et al. | 712/205 |
| 2008/0281476 A1* | 11/2008 | Bose et al. | 700/300 |
| 2009/0265568 A1 | 10/2009 | Jackson | |
| 2009/0327780 A1 | 12/2009 | Dawkins et al. | |
| 2010/0122100 A1 | 5/2010 | Strumper | |
| 2010/0191936 A1* | 7/2010 | Khatri et al. | 712/42 |
| 2010/0194434 A1* | 8/2010 | Tran Vo et al. | 326/93 |

(Continued)

OTHER PUBLICATIONS

Notice of Allowance mailed Mar. 1, 2012 for U.S. Appl. No. 12/539,978; 6 pages.

(Continued)

*Primary Examiner* — Emerson Puente
*Assistant Examiner* — Dong Kim
(74) *Attorney, Agent, or Firm* — Francis Lammes; Stephen J. Walder, Jr.; William J. Stock

(57) ABSTRACT

A mechanism is provided for guarded, multi-metric resource control. Monitoring is performed for an intended action to address a negative condition from a resource manager in a plurality of resource managers in the data processing system. Responsive to receiving the intended action, a determination is made as to whether the intended action will cause an additional negative condition within the data processing system. Responsive to determining that the intended action will cause the additional negative condition within the data processing system, at least one alternative action is identified to be implemented in the data processing system that addresses the negative condition while not causing any additional negative condition. The at least one alternative action is then implemented in the data processing system.

17 Claims, 5 Drawing Sheets

(56) References Cited

U.S. PATENT DOCUMENTS

| | | |
|---|---|---|
| 2010/0218005 A1 | 8/2010 | Jain et al. |
| 2010/0332876 A1 | 12/2010 | Fields, Jr. et al. |
| 2010/0332883 A1 | 12/2010 | Saxe et al. |
| 2011/0161627 A1 | 6/2011 | Song et al. |
| 2011/0265090 A1* | 10/2011 | Moyer et al. ............ 718/103 |

OTHER PUBLICATIONS

Notice of Allowance mailed Mar. 5, 2012 for U.S. Appl. No. 12/539,941; 6 pages.

Basak, Jayanta et al., "Predictive Power Gating with Optional Guard Mechanism", U.S. Appl. No. 12/539,978, filed Aug. 12, 2009, 1 page.

Basak, Jayanta et al., "Two-Level Guarded Predictive Power Gating", U.S. Appl. No. 12/539,941, filed Aug. 12, 2009, 1 page.

Brooks, David et al., "Dynamic Thermal Management for High-Performance Microprocessors", Proceedings of the 7th International Symposium on High-Performance Computer Architecture, Monterrey, Mexico, Jan., 2001, 12 pages.

Gupta, Aarti et al., "Toward Formalizing a Validation Methodology Using Simulation Coverage", ACM/IEEE 34th Annual Design Authomation Conference, 1997, pp. 740-745.

Hu, Zhigang et al., "Microarchitectural Techniques for Power Gating of Execution Units", IEEE International Symposium on Low Power Electronics and Design, Aug. 2004, pp. 32-37.

Lungu, Anita et al., "Multicore Power Management: Ensuring Robustness via Early-Stage Formal Verification", Seventh ACM/IEEE International Conference on Formal Methods and Models for Codesign (MEMOCODE '09), Cambridge, MA, Jul., 2009, 10 pages.

Madan, Niti et al., "Guarded Power Gating in a Multi-Core Setting", Workshop on Energy-Efficient Design (WEED 2010), Jun. 17, 2010, pp. 26-31.

Youssef, Ahmed et al., "Dynamic Standby Prediction for Leakage Tolerant Microprocessor Functional Units", International Symposium on Microarchitecture, Proc. of the 39th Annual IEEE/ACM International Symposium of Microarchitecture, http://portal.acm.org/citation.cfm?id=1194864, 2006, 4 pages.

Office Action mailed Nov. 18, 2011 for U.S. Appl. No. 12/539,941; 8 pages.

Office Action mailed Nov. 28, 2011 for U.S. Appl. No. 12/539,978; 8 pages.

Response to Office Action filed with the USPTO on Feb. 2, 2012 for U.S. Appl. No. 12/539,941; 9 pages.

Response to Office Action filed with the USPTO on Feb. 2, 2012 for U.S. Appl. No. 12/539,978; 9 pages.

* cited by examiner

GUARDED, MULTI-METRIC RESOURCE CONTROL FOR SAFE AND EFFICIENT MICROPROCESSOR MANAGEMENT

BACKGROUND

The present application relates generally to an improved data processing apparatus and method and more specifically to mechanisms for safe and efficient microprocessor management using guarded, multi-metric resource control.

In the field of microprocessor architectures, predicting certain key events ahead of their actual occurrence is a key problem. Such predictive algorithms are usually applied for the purposes of enhancing net performance through dynamic resource management. Dynamic resource management enhances the efficiency and/or robustness of microprocessor and related data processing system operation. The metrics of interest in quantifying the objective function in such dynamic resource management may be performance, power consumption, temperature, reliability, or the like. One known problem in specifying the architecture of such a workload-driven, dynamic resource manager is the problem that no matter how carefully the dynamic resource management has been designed, there are occasions when the dynamic resource management malfunctions in the sense that the intended benefit is not derived and, in fact, the net effect may indeed turn out to be contrary to the original objective. For example, a feature intended to boost performance might on occasion degrade performance, a feature intended to save power may end up costing more power, or the like. Thus, in some cases, such a dynamic resource manager may actually be the cause of a safety issue, in that, even an occasional violation of intended specifications may cause the system to experience an unplanned outage or even be permanently damaged. A given microprocessor system is also prone to malfunction and fail to meet intended system specifications in the event of a malicious security attack. Since resource management algorithms are not fool-proof, a hacker may be able to deliberately create unsafe workload conditions in order to cause damage or service outage of these computing systems. Power-viruses that test a given microprocessor's thermal limits and cause the microprocessor to overheat advertently are already known to exist.

An existing solution approach is to try and devise a "water-tight" resource management algorithm that never fails to yield the intended benefit, and the design team tries to rely on simulation-based validation or format verification of the robustness of the devised algorithm in the case of simulation-based validation, if there is an isolated workload for which there is a "negative" benefit, the design team may still approve the decision to include the feature into the design. However, this may be both unsatisfactory and unsafe, since the space of all possible workloads may not be determined during the design of the microprocessor system. Thus, when the algorithm is deployed in the field, there may be numerous (not infrequent) unanticipated workload patterns across the many processor cores inside the chip or system that cause the designed algorithm to "malfunction" in the sense described above. In the case of formal verification, the analysis complexity (especially across today's multi/many-core processors) is often too steep, and model abstraction required to address that issue may fail to guarantee safe and efficient operation.

Another method used is a "bang-bang" control system, in which a drastic action to counter a dangerous or unacceptable trend is executed in order to maintain safe functionality. Such control systems usually result in severe degradation of one or more critical figures of merit, when the safeguarding mechanism is engaged. For example, reacting to a thermal emergency in response to a monitored thermal trigger by stopping the processor clock or severely throttling the instruction fetch mechanism usually results in significant loss of performance, A management algorithm may be designed to minimize performance loss, but saving power while safeguarding performance using such methods may be difficult and preventing some corner-case workload from getting severely affected in terms of delivered performance may be virtually impossible.

SUMMARY

In one illustrative embodiment, a method, in a data processing system, is provided for guarded, multi-metric resource control. The illustrative embodiment monitors for an intended action to address a negative condition from a resource manager in a plurality of resource managers in the data processing system. Responsive to receiving the intended action, the illustrative embodiment determines whether the intended action will cause an additional negative condition within the data processing system. Responsive to determining that the intended action will cause the additional negative condition within the data processing system, the illustrative embodiment identifies at least one alternative action to be implemented in the data processing system that addresses the negative condition while not causing any additional negative condition. The illustrative embodiment then implements the at least one alternative action in the data processing system.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for guarded, multi-metric dynamic resource management, in the context of a multi-core microprocessor chip and associated system, such that targeted figures of merit do not exceed pre-specified worst-case ranges and drastic or unpredictable loss of system performance is virtually eliminated. The illustrative embodiments continuously monitor various types of metric optimization mechanisms within the data processing system in such a manner as to guard against violation of specified limits or ranges in figures of merit of interest, such as performance, power, temperature, reliability, or the like, through dynamic adjustment of the optimization mechanisms, which may also be referred to as metric managers or management devices. The dynamic adjustment of the management devices may involve adjusting a degree of engagement of one or more particular management devices, completely turning off a particular management device, turning a management device back on after a predetermined time interval, or the like. The monitoring of metrics may include individual methods of online estimation of power, performance, temperature, reliability, or the like.

Figure 1:
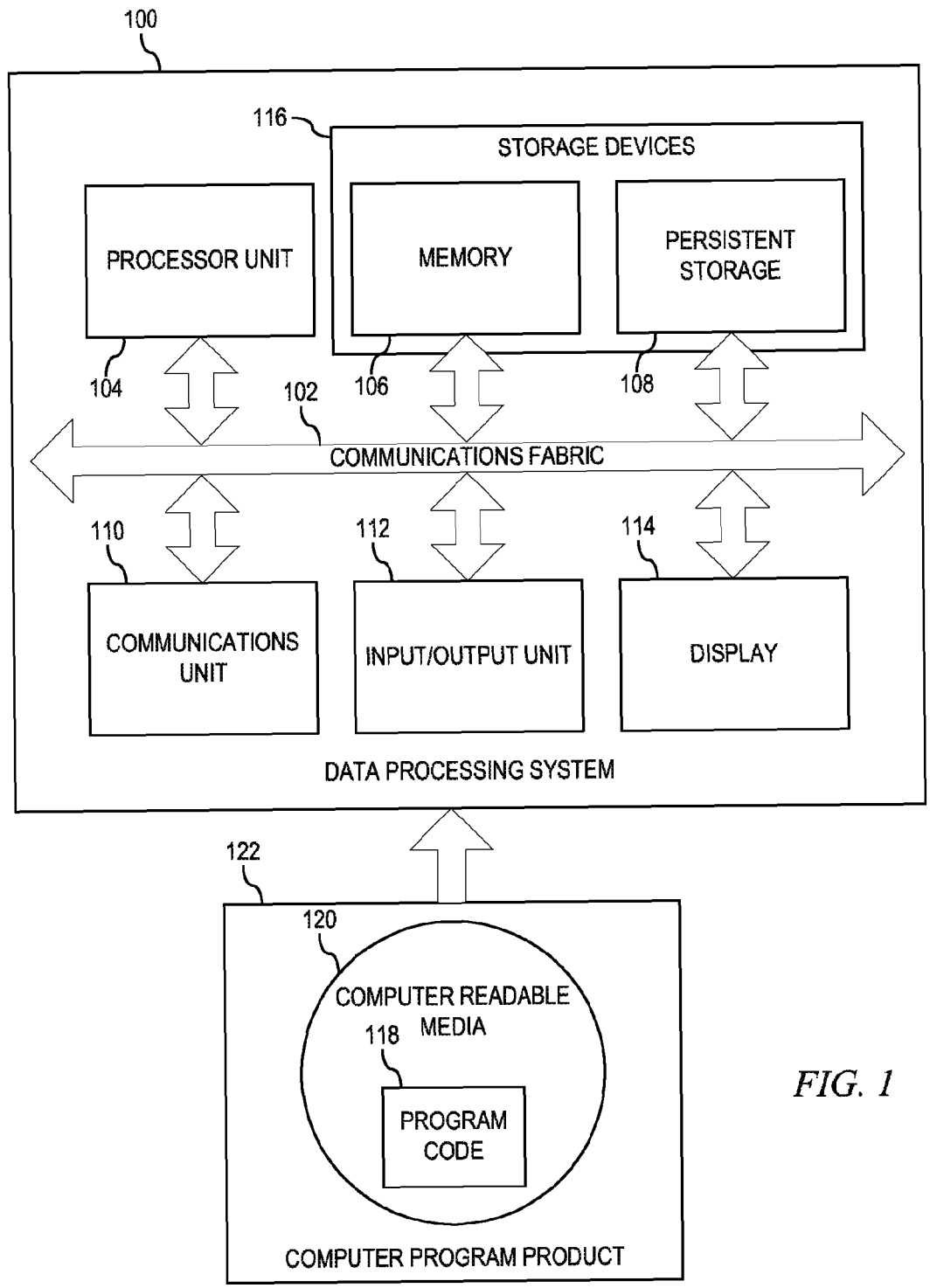
FIG. 1 depicts a block diagram of a data processing system in which illustrative embodiments may be implemented.
Figure 2:
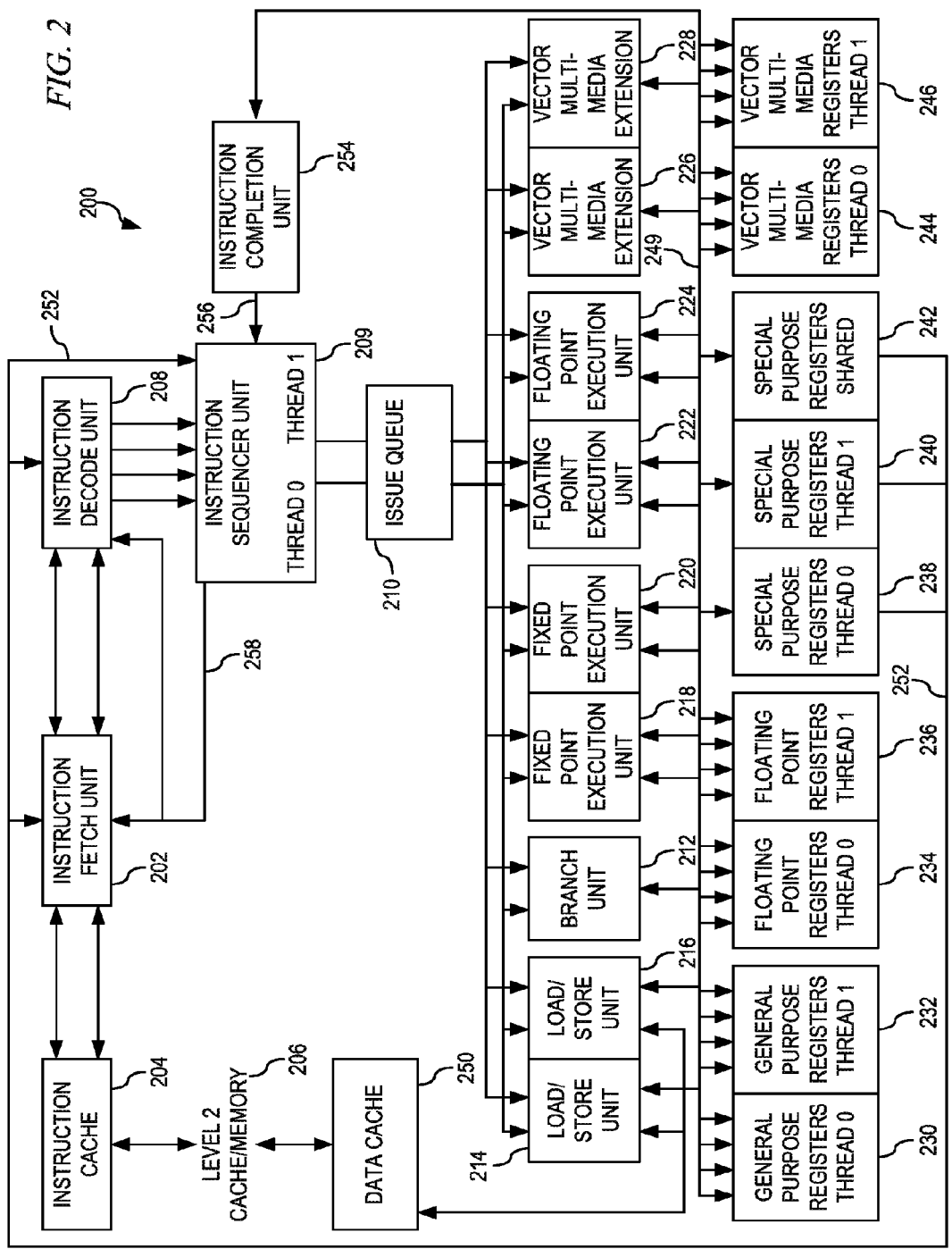
FIG. 2 depicts an exemplary block diagram of a conventional dual threaded processor design showing functional units and registers in accordance with an illustrative embodiment.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of using power proxies combined with on-chip actuators to meet a defined power target, this is only an example and is not intended to state or imply any limitation with regard to the features of the present invention. To the contrary, the illustrative embodiments are intended to include distributed data processing environments and embodiments in which power proxies combined with on-chip actuators may be used to meet a defined power target.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a block diagram of a data processing system in which illustrative embodiments may be implemented. Data processing system 100 is an example of a computer, in which computer usable program code or instructions implementing the processes may be located for the illustrative embodiments in this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 120 are examples of storage devices in a tangible form. In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Referring to FIG. 2, an exemplary block diagram of a conventional dual threaded processor design showing functional units and registers is depicted in accordance with an illustrative embodiment. Processor 200 may be implemented as processing unit 104 in FIG. 1 in these illustrative examples.

Processor 200 comprises a single integrated circuit superscalar microprocessor with dual-thread simultaneous multithreading (SMT) that may also be operated in a single threaded mode. Accordingly, as discussed further herein below, processor 200 includes various units, registers, buffers, memories, and other sections, all of which are formed by integrated circuitry. Also, in an illustrative embodiment, processor 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2(L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for up to two threads at the same time. Instruction decode unit 208 decodes multiple instructions for up to two threads at the same time and passes decoded instructions to instruction sequencer unit (ISU) 209.

Processor 200 may also include issue queue 210, which receives decoded instructions from ISU 209. Instructions are stored in the issue queue 210 while awaiting dispatch to the appropriate execution units. For an out-of order processor to operate in an in-order manner, ISU 209 may selectively issue instructions quickly using false dependencies between each instruction. If the instruction does not produce data, such as in a read after write dependency, ISU 209 may add an additional source operand (also referred to as a consumer) per instruction to point to the previous target instruction (also referred to as a producer). Issue queue 210, when issuing the producer, may then wakeup the consumer for issue. By introducing false dependencies, a chain of dependent instructions may then be created, whereas the instructions may then be issued only in-order. ISU 209 uses the added consumer for instruction scheduling purposes and the instructions, when executed, do not actually use the data from the added dependency. Once ISU 209 selectively adds any required false dependencies, then issue queue 210 takes over and issues the instructions in order for each thread, and outputs or issues instructions for each thread to execution units 212, 214, 216, 218, 220, 222, 224, 226, and 228 of the processor. This process will be described in more detail in the following description.

In an illustrative embodiment, the execution units of the processor may include branch unit 212, load/store units (LSUA) 214 and (LSUB) 216, fixed point execution units (FXUA) 218 and (FXUB) 220, floating point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored once an instruction has completed execution, ARFs 230, 232, 234, 236, 238, 240, 242, 244, and 246 may store data separately for each of the two threads and by the type of instruction, namely general purpose registers (GPRs) 230 and 232, floating point registers (FPRs) 234 and 236, special purpose registers (SPRs) 238 and 240, and vector registers (VRs) 244 and 246.

Separately storing completed data by type and by thread assists in reducing processor contention while processing instructions.

The processor additionally includes a set of shared special purpose registers (SFR) 242 for holding program states, such as an instruction pointer, stack pointer, or processor status word, which may be used on instructions from either or both threads. Execution units 212, 214, 216, 218, 220, 227, 224, 226, and 228 are connected to ARFs 230, 232, 234, 236, 238, 240, 242, 244, and 246 through simplified internal bus structure 249.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 output their destination register operand data to SPRs 238, 240, and 242 when the instruction has passed the point of flushing in the pipeline. Program states, such as an instruction pointer, stack pointer, or processor status word, stored in SPRs 238 and 240 indicate thread priority 252 to ISU 209. During execution of an instruction, VMXA 226 and VMXB 228 output their destination register operand data to VRs 244 and 246 when the instruction has passed the point of flushing in the pipeline.

Data cache 250 may also have associated with it a non-cacheable unit (not shown) which accepts data from the processor and writes it directly to level 2 cache/memory 206. In this way, the non-cacheable unit bypasses the coherency protocols required for storage to cache.

In response to the instructions input from instruction cache 204 and decoded by instruction decode unit 208, ISU 209 selectively dispatches the instructions to issue queue 210 and then onto execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed point mathematical operations on register source operands, such as addition, subtraction, ANDing, ORing and XORing. FPUA 222 and FPUB 224 execute floating point mathematical operations on register source operands, such as floating point multiplication and division. LSUA 214 and LSUB 216 execute load and store instructions, which move operand data between data cache 250 and ARFs 230, 232, 234, and 236. VMXA 226 and VMXB 228 execute single instruction operations that include multiple data. Branch unit 212 executes branch instructions which conditionally alter the flow of execution through a program by modifying the instruction address used by IFU 202 to request instructions from instruction cache 204.

Instruction completion unit 254 monitors internal bus structure 249 to determine when instructions executing in execution units 212, 214, 216, 218, 220, 222, 224, 226, and 228 are finished writing their operand results to ARFs 230, 232, 234, 236, 238, 240, 242, 244, and 246. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 254 monitors for the completion of instructions, and sends control information 256 to ISU 209 to notify ISU 209 that more groups of instructions can be dispatched to execution units 212, 214, 216, 218, 220, 222, 224, 226, and 228. ISU 209 sends dispatch signal 258, which serves as a throttle to bring more instructions down the pipeline to the dispatch unit, to IFU 202 and instruction decode unit 208 to indicate that it is ready to receive more decoded instructions. White processor 200 provides one detailed description of a single integrated circuit superscalar microprocessor with dual-thread simultaneous multi-threading (SMT) that may also be operated in a single threaded mode, the illustrative embodiments are not limited to such microprocessors. That is, the illustrative embodiments may be implemented in any type of processor using a pipeline technology.

Currently, individual resource control/management algorithms used in optimizing efficiency metrics (e.g. those related to performance, power, temperature, reliability, etc) while often being adaptive, are usually without guard mechanisms. For example:

Three-table branch prediction algorithms are "always on" algorithms regardless of performance benefit and power cost;

Data prefetch algorithms are usually "always on" non-adaptive algorithms where the level of aggressiveness may not be changed even depending on context, i.e. when the data prefetch algorithm is hurting performance while burning extra power;

Dynamic voltage and frequency scaling (DVFS) and dynamic power gating (DPG) algorithms are "always on" algorithms that, once engaged by the data processing system, provide power benefit and performance loss indications that are simply accepted for what the numbers turn out to be without regard to other issues in the data processing system;

Dynamic activity migration or task scheduling algorithms are "always on" that, once engaged by the data processing system, provide for thermal mitigation, provide thermal benefit and performance cost indications that are simply accepted for what the numbers turn out to be without regard to other issues in the data processing system;

Dynamic reliability management algorithms are "always on" that, once engaged by the data processing system that, once engaged by the data processing system, provide for thermal mitigation, provide benefit and power-performance cost indications that are simply accepted for what the numbers turn out to be without regard to other issues in the data processing system; and Unit-level or fine-grain clock-gating algorithms are "always on" that, once designed into the chip, always paying the upfront cycle-time hit, regardless of benefit.

Thus, the illustrative embodiments provide a guard mechanism that protects against events such as a malicious attack, an inherent unstable workload behavior, or the like. That is, when it comes to global management of individual goal-oriented resource managers, there are no known mechanisms for cross-metric guarding. That is, for example, a power-centric resource manager guards against net power increase. However, changes made by the power-centric resource manager must also be guarded against causing performance degradation beyond a certain range, inductive noise margins beyond a certain range, or the like. Similarly, as another example, a performance-centric resource manager guards against net performance issues. However, changes made by the performance resource manager must also be guarded against power, thermal, and reliability limits. Thus, multi-metric guard management mechanism is needed for multi-dimensional, global management of inter-related metrics, such as power, temperature, reliability, and performance.

Figure 3:
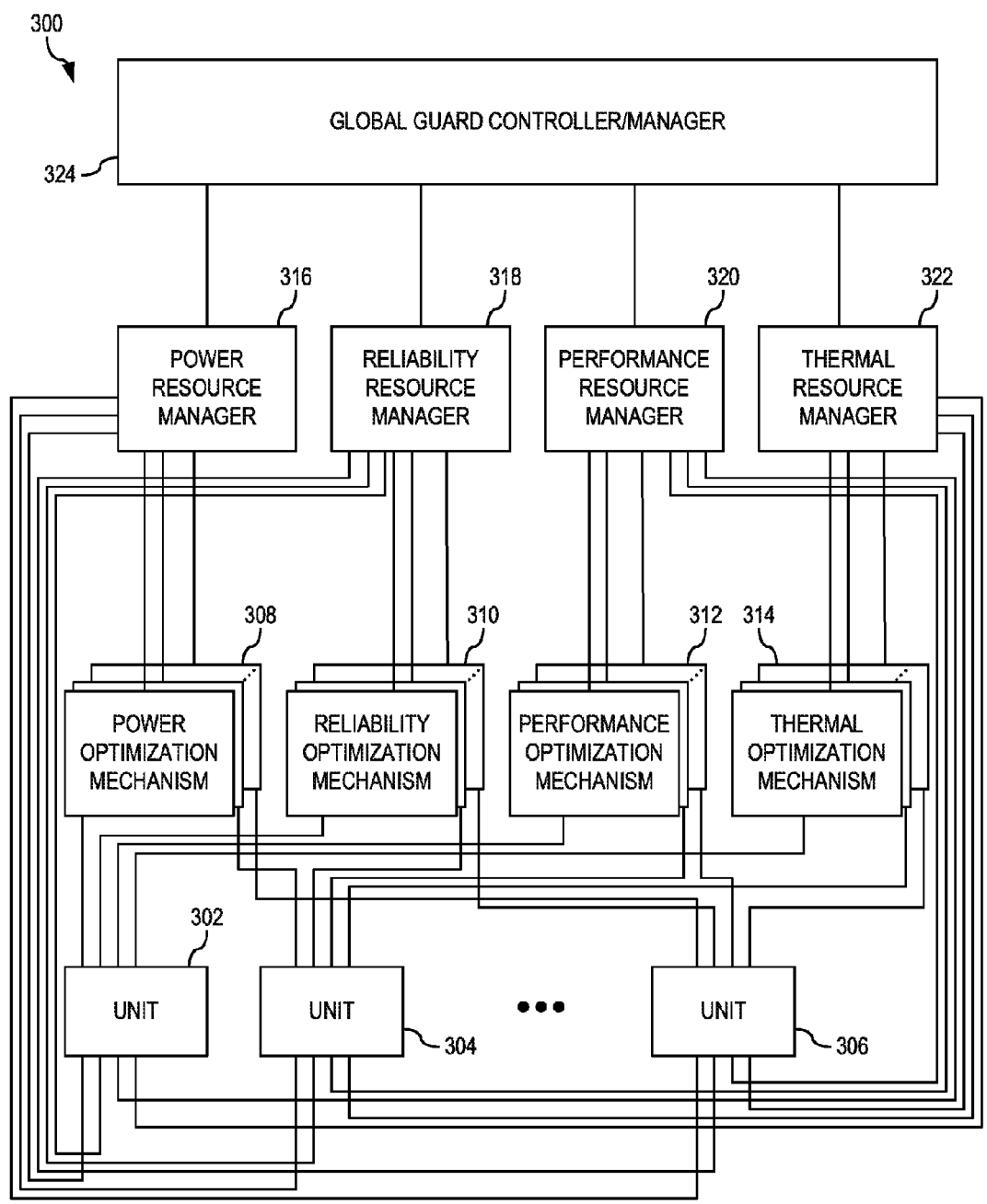
FIG. 3 depicts a block diagram of a guarded, multi-metric resource control mechanism within a data processing system for safe and efficient microprocessor management in accordance with an illustrative embodiment.

FIG. 3 depicts a block diagram of a guarded, multi-metric resource control mechanism within a data processing system for safe and efficient microprocessor management in accordance with an illustrative embodiment. Data processing system 300 comprises units 302, 304, and 306 that are monitored by various uni-dimensional metric optimization mechanisms, such as, for example, power optimization mechanism 308, reliability optimization mechanism 310, performance optimization mechanism 312, and thermal optimization mechanism 314. Each of uni-dimensional metric optimization mechanisms 308, 310, 312, and 314 may optionally be equipped with an embedded "local" guard mechanism that may disable, enable, or adjust the operational semantics of that metric optimization mechanism, if the effect of metric-specific optimization action is deemed to be contrary to the desired optimization goal or inadequate in terms of the expected amount or quality of optimization. Units 302, 304, and 306 may be an execution unit within a microprocessor core, a microprocessor core, an entire microprocessor, or another device within the data processing system 300 that consumes power. Data processing system 300 also comprises various resource managers, such as, for example, power resource manager 316, reliability resource manager 318, performance resource manager 320, and thermal resource manager 322. Each of these resource managers, in coordination with the corresponding metric optimization mechanism 308, 310, 312 or 314, identifies sequences of events for each of the monitored units 302, 304, and 306. The events may comprise, but are not limited to, power usage, change in power, voltage, change in voltage, frequency, temperature, change in temperature, number of cores powered on, number of cores powered off, wake-up latency, number of wake-ups, system response, misprediction rates, or the like.

In the context of power-efficient computing, if a sequence of events may be predicted beforehand for a particular unit, then power resource manager 316 may issue commands to the associated power optimization mechanism 308 for the particular resource or unit so that that particular resource or unit may be adjusted, gated off, gated on, or the like, in order to save power consumption or to consume just enough power to meet an upcoming performance demand. That is, power resource manager 316 may implement unit-level dynamic voltage and frequency scaling (DVFS) and/or dynamic power gating (DPG). In the context of reliability computing, if a sequence of events may be predicted beforehand for a particular unit, then reliability resource manager 318 may issue commands to the associated reliability optimization mechanism 310 for the particular resource or unit so that that particular resource or unit may be adjusted, gated off, gated on, or the like, in order to improve reliability of the particular unit. For example, reliability resource manager 318 may implement unit-level dynamic voltage droop control algorithms that control the frequency for the particular unit, in order to avoid circuit timing related malfunctions. Similar functions are performed by performance resource manager 320 and thermal resource manager 322. In that, performance resource manager 320 may implement unit-level dynamic workload management algorithms that control the workload for a particular unit and thermal resource manager 322 may implement unit-level DVFS, DPG, and/or workload management control for the particular unit. In applying such controls, performance resource manager 320 and thermal resource manager 322 work in conjunction with the corresponding uni-dimensional metric optimization mechanisms 312 and 314 as in the previous cases.

However, DVFS actuations and DPG actuations performed by power resource manager 316 may cause performance degradation and increased failure rates from transient errors. Further, frequency actuations performed by reliability resource manager 318 may cause unacceptable performance degradation. Similar issues occur with other resource managers, such as performance resource manager 320 and thermal resource manager 322, when the resource managers are operating without knowledge of actions being performed by other resource managers in data processing system 300. Thus, data processing system 300 further comprises global guard controller/manager 324.

Global guard controller/manager 324 is responsible for monitoring the multi-metric state of data processing system 300. As each of the resource managers obtain their respective metric information from units 302, 304, and 306, via power optimization mechanism 308, reliability optimization mechanism 310, performance optimization mechanism 312, and thermal optimization mechanism 314, this metric information is passed by the resource managers to global guard controller/manager 324. For each predetermined time period, each resource manager determines whether their observed metrics provide a positive or negative benefit. If the observed metrics provide a positive benefit, then the resource manager usually performs no action. In some instances, if the benefit is positive but still below expected levels, then some action may be needed by the resource manager. If the observed metrics provide a negative benefit, then the resource manager would usually send one or more commands to the respective metric optimization mechanism associated with the unit to permit power optimization of the unit, prevent power optimization of the unit, or adjust a parameter, such as voltage, frequency, a resource size, data bandwidth level, workload, or the like, associated with the unit.

However, prior to sending such a command, the resource manager sends the intended action to global guard controller/manager 324 in order to verify whether the intended action will provide a positive or a negative benefit to the entirety of data processing system 300 with regard to the other actions being performed by the other resource managers in data processing system 300. In order to determine whether the action performed by one resource manager (say "power") will have a positive or a negative benefit with regard to the other actions being performed by the other resource managers in data processing system 300, global guard controller/manager 324 first determines whether, the power, temperature, performance, reliability, or the like are within current specified limits for data processing system 300 and whether other metrics (e.g., performance) dependent on the targeted resource manager ("power") are well above expected levels. That is, data processing system may have preset or predetermined specifications that indicate the specific performance, reliability, temperature, and power that data processing system 300 should be operating at or near to. These preset or predetermined specifications may be set by the manufacturer, administrator, user, or the like, and thus may change over time. Therefore, global guard controller/manager 324 looks at the current specification in order to determine whether the power, temperature, performance, reliability, or the like, are within current specified limits for data processing system 300. Global guard controller/manager 324 also ensures that metrics that may be affected by the targeted resource manager and/or corresponding metric optimization mechanism are well above expected values.

If power, temperature, performance, reliability, or the like, are within current specified limits for data processing system 300 and if co-dependent metrics are above expected levels of efficiency, then global guard controller/manager 324 acknowledges that the action to be performed by the resource manager may have a net positive benefit, without causing a noticeable degradation in co-dependent metrics and the resource manager sends a command to the resource manager indicating that the resource manager may proceed with sending one or more commands to the respective metric optimization mechanism associated with the unit to permit power optimization of the unit, prevent power optimization of the unit, or adjust a parameter, such as voltage, frequency, a resource size, data bandwidth, workload, or the like, associated with the unit. However, if the global metric state composed of power, temperature, performance, reliability, or the like, is such that the targeted resource management action is deemed to be not warranted, then global guard controller/manager 324 makes an identification of one or more alternative actions to be performed within data processing system 300 to address the globally negative benefit that would have been caused by the recommended action of the individual resource manager.

That is, as discussed previously, a change in power (via reduction of voltage and frequency) may cause performance degradation and increased failure rates from transient errors. Thus, global guard controller/manager 324 performs a lookup in predefined inter-metric sensitivity table based on the currently observed metrics from all of the resource managers, for an algorithm, function, or the like that global guard controller/manager 324 may use to identify a set of units to permit power optimization of, a set of units to prevent power optimization of, or one or more parameters, such as voltage, frequency, a resource size, data bandwidth, workload, or the like, to adjust for a set of units within data processing system 300 in order to address the negative benefit implied by the individual resource manager's recommended action.

For example, if power resource manager 316 recommends a power reduction action via core-level power gating and associated workload consolidation into fewer cores, and global guard controller/manager 324 identifies that the reliability of data processing system 300 fails to be within current specified limits for data processing system 300 because the number of core on-off events may become too high, then global guard controller/manager 324 may identify, within the predefined inter-metric sensitivity table, a function or algorithm that addresses power (W) as a function of reliability (R), voltage (V), frequency ft), and number of powered on-cores (N). Thus, in order to address the potentially negative reliability benefit identified by global guard controller/manager 324, four different actions will be performed. That is, a threshold of reliability of data processing system may be increased or decreased, voltage to a set of units may be increased or decreased, frequency to a set of units may be increased or decreased, and the number of powered-on cores may be increased or decreased. Thus, rather than acknowledging the action to be performed by power resource manager 316, global guard controller/manager 324 may send alternative commands to be issued not only to power resource manager 316 but also to reliability resource manager 318, performance resource manager 320, and/or thermal resource manager 322. Further any command issued by global guard controller/manager 324 may have an associated time component that indicates, for example, that a unit should be gated off for only a specific time period or that the frequency to a unit should only be increased for a specific time period.

In addition to guarding multi-metric actions within data processing system 300, global guard controller/manager 324 may also be able to identify other occurrences within data processing system 300 based on the identified events within data processing system 300 such as power usage, change in power, voltage, change in voltage, frequency, temperature, change in temperature, number of cores powered on, number of cores powered off, wake-up latency, number of wake-ups, system response, misprediction rates, or the like. For example, if a number of temperature based throttles is greater than a low throttle threshold then there may be a virus within data processing system 300 and global guard controller/manager 324 may issue a virus alert. Global guard controller/manager 324 may then attempt to identify the culprit task in data processing system by identifying the unit that is being throttled and then identifying previous or current tasks being run by the unit. Once global guard controller/manager 324 identifies the culprit task, then global guard controller/manager 324 may issue commands to isolate and remove the culprit task. If no specific task is identified, then global guard controller/manager 324 may determine whether system performance is less than an acceptable system performance limit and, if so, temporarily increase the tow throttle threshold. Further, in an event where a virus alert is identified or other event occurs that rises to a level where an administrator needs to be warned, global guard controller/manager 324 may also issue notifications to the administrator.

Figure 4:
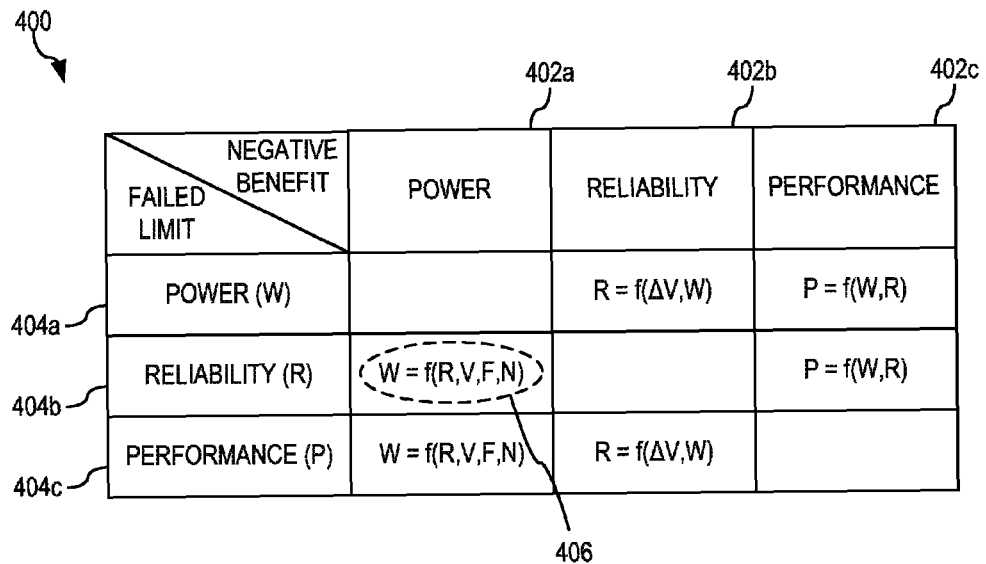
FIG. 4 depicts an exemplary inter-metric sensitivity table in accordance with an illustrative embodiment.

FIG. 4 depicts an exemplary inter-metric sensitivity table used by global guard controller/manager 324 of FIG. 3 in accordance with an illustrative embodiment. Predefined inter-metric sensitivity table 400 illustrates sensitivity relationships between negative benefits 402a-402c identified by a particular resource manager and failed limits 404a-404c identified by a global guard controller/manager, such as global guard controller/manager 324 in FIG. 3. In keeping with the previous example, if a power resource manager identifies a negative power situation and recommends a specific action to optimize the power metric and the global guard controller/manager identifies the reliability of the data processing system fails to be within current specified limits for the data processing system because the number of core wake-ups is too high, then the global guard controller/manager 324 may identify within predefined inter-metric sensitivity table 400, function 406 that addresses power (W) as a function of reliability (R), voltage (V), frequency (F), and number of powered on-cores (N). While predefined inter-metric sensitivity table 400 illustrates functions that are based on reliability (R), voltage (V), frequency (F), number of powered on-cores (N), power (W) and/or maximum voltage swing observed ($\Delta V$), other functions may also be incorporated into predefined inter-metric sensitivity table 400. That is, predefined inter-metric sensitivity table 400 may also include functions based on power usage, change in power, temperature, change in temperature, number of cores powered off, wake-up latency, number of wake-ups, system response, misprediction rates, or the like, in addition to reliability (R), voltage (V), frequency (F), number of powered on-cores (N), power (W), and/or maximum voltage swing observed ($\Delta V$).

Figure 5:
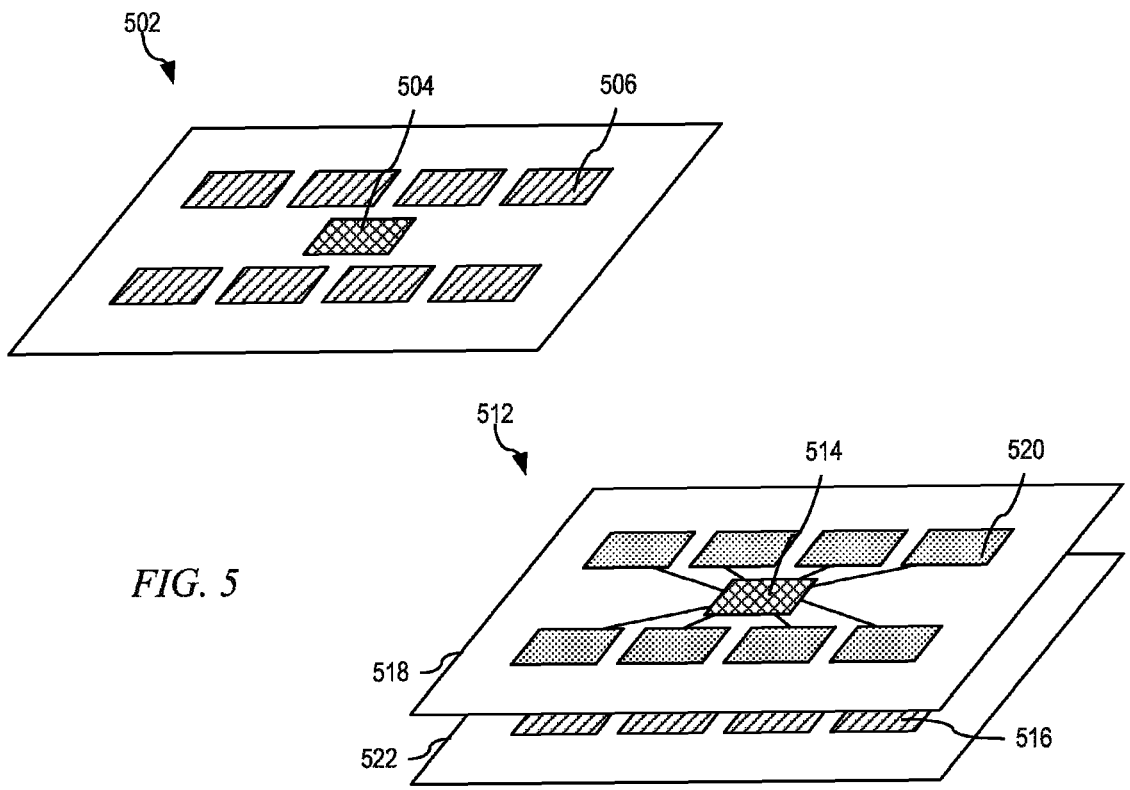
FIG. 5 depicts exemplary implementations of a global guard controller/manager in both a two-dimensional integrated chip design and a three-dimensional integrated chip design in accordance with an illustrative embodiment.

As will be appreciated by one skilled in the art, the illustrative embodiments may be implemented both in two-dimensional (2D) as well as three-dimensional (3D) integrated chip designs. FIG. 5 depicts exemplary implementations of a global guard controller/manager in both a 2D integrated chip design and a 3D integrated chip design in accordance with an illustrative embodiment. In 2D integrated chip design 502, the monitor-and-control mechanism 504 is integrated amongst various processing and memory components 506. In 3D integrated chip design 512, monitor-and-control mechanism 514 may be in a dedicated monitor-and-control layer 518 along with other regulator and metric optimization mechanisms 520 while processing and memory components 516 are in processing and memory component layer 522 in order to implement the design in a modular and area-efficient manner. However, even in 3D integrated chip design 512, monitor-and-control mechanism 514 is integrated amongst various processing and memory components 516.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the tatter scenario, the remote computer may be connected to the user's computer through any type of network, including a local area network (LAN) Or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 6:
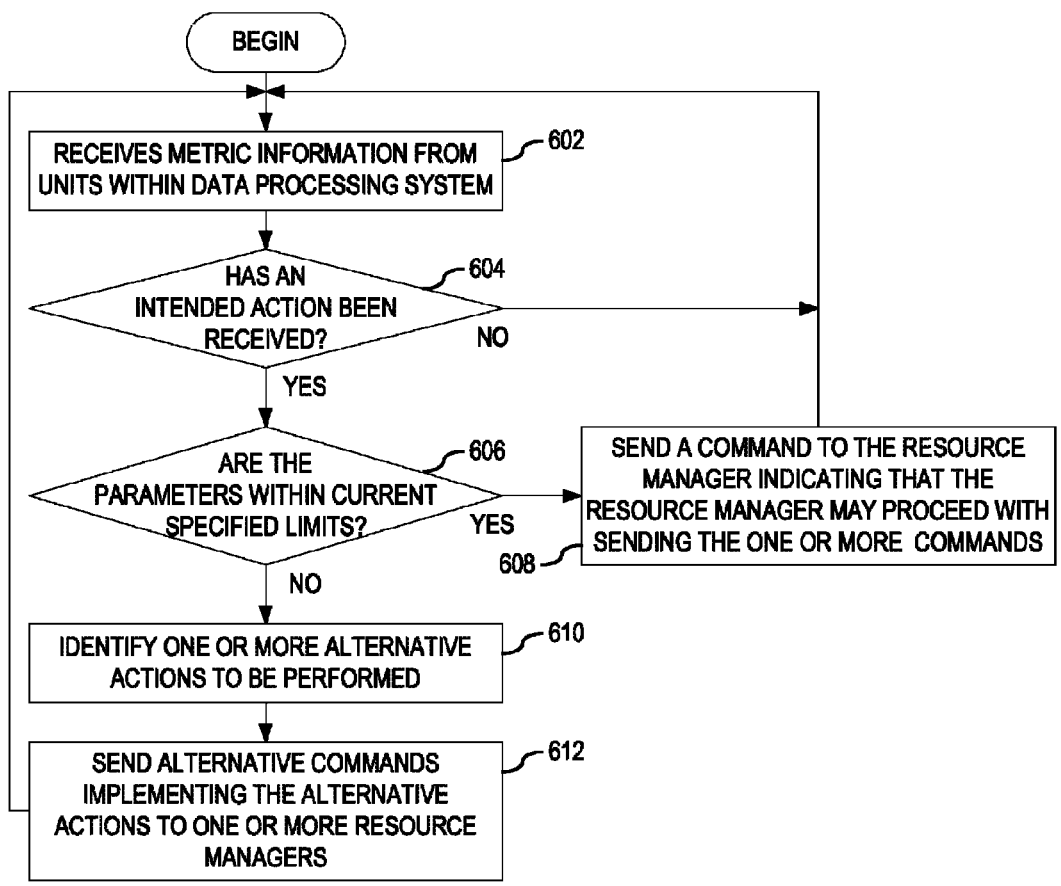
FIG. 6 depicts a flowchart for the operation performed by a global guard controller/manager in accordance with an illustrative embodiment.

FIG. 6 depicts a flowchart for the operation performed by a global guard controller/manager in accordance with an illustrative embodiment. As the operation begins, the global guard controller/manager receives metric information from units within data processing system via various metric optimization mechanisms and resource managers (step 602). The global guard controller/manager then monitors input from the resource managers in order to determine whether an intended action has been received from one of the resource managers in the data processing system (step 604). If at step 604 the global guard controller/manager fails to receive an intended action, then the operation returns to step 602 where the global guard controller/manager continues to observe the global multimetric state of the chips within the data processing system.

If at step 604 the global guard controller/manager receives an intended action from one of the resource managers, then the global guard controller/manager verifies whether the intended action will provide a positive or a negative benefit to the entirety of the data processing system with regard to the other actions being performed by the other resource managers in data processing system. In order to determine whether the action performed by one resource manager will have a positive or a negative benefit with regard to the other actions being performed by the other resource managers in the data processing system, the global guard controller/manager determines whether the power, temperature, performance, reliability, or the like, are within current specified limits for the data processing system (step 606). This check includes consideration of co-dependent metric margins, as elaborated earlier with regard to FIG. 3. That is, the data processing system may have preset or predetermined specifications that indicate the specific performance, reliability, temperature, and power that the data processing system should be operating at or near to. These preset or predetermined specifications may be set by the manufacturer, administrator, user, or the like, and thus may change over time. Therefore, the global guard controller/manager looks at the current specification in order to determine whether the power, temperature, performance, reliability, or the like, are within current specified limits for the data processing system. Further, the global guard controller/manager ensures that co-dependent metric values are well above a specified margin, as discussed earlier with regard to FIG. 3.

If at step 606 the global metric state (composed of power, temperature, performance, reliability, or the like) for the data processing system is deemed to be in an acceptable value range, then the global guard controller/manager acknowledges that the action to be performed by the resource manager will have a net positive benefit and the global guard controller/manager sends a command to the resource manager indicating that the resource manager may proceed with sending the one or more commands (step 608), with the operation returning to step 602 thereafter. However, if at step 606 the global metric state for the data processing system is deemed to be not amenable to the action recommended by the individual resource manager, then the global guard controller/manager makes an identification of one or more alternative actions to be performed within the data processing system to address the net negative benefit identified by the global guard controller/manager (step 610).

The global guard controller/manager performs a lookup in predefined inter-metric sensitivity table, such as inter-metric sensitivity table 400 of FIG. 4, based on the currently observed metrics from all of the resource managers, for an algorithm, function, or the like, that global guard controller/manager may use to identify a set of units to permit power optimization of, a set of units to prevent power optimization of, or one or more parameters, such as voltage, frequency, workload, or the like, to adjust for a set of units within the data processing system in order to address the negative benefit observed by the resource manager. Once the one or more alternative actions have been identified, the global guard controller/manager sends alternative commands implementing the alternative actions to one or more resource managers (step 612), with the operation returning to step 602 thereafter. Any command issued by the global guard controller/manager may have an associated time component.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for guarded, multi-metric dynamic resource management, in the context of a multi-core microprocessor chip and associated system, such that targeted figures of merit do not exceed pre-specified worst-case ranges and drastic or unpredictable loss of system performance is virtually eliminated. The illustrative embodiments continuously monitor various types of metric optimization mechanisms within the data processing system in such a manner as to guard against violation of specified limits or ranges in figures of merit of interest, such as performance, power, temperature, reliability, or the like, through dynamic adjustment of the metric optimization mechanisms, which may also be referred to as metric managers or management devices. The dynamic adjustment of the management devices may involve adjusting a degree of engagement of one or more particular management devices, completely turning off a particular management device, turning a management device back on after a predetermined time interval, or the like. The monitoring of metrics may include individual methods of online estimation of power, performance, temperature, reliability, or the like.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for guarded, multi-metric resource control, the method comprising:
   monitoring, by a processor, for an intended action to address a negative condition from a resource manager in a plurality of resource managers in the data processing system;
   responsive to receiving the intended action, determining, by the processor, whether the intended action will cause an additional negative condition within the data processing system;
   responsive to determining that the intended action will cause the additional negative condition within the data processing system, identifying, by the processor, a plurality of alternative actions to be implemented in the data processing system that addresses the negative condition while not causing any additional negative condition, wherein identifying the plurality of alternative actions to be implemented in the data processing system comprises:
      identifying, by the processor, a function that addresses the negative condition based on the negative condition and the additional negative condition; and
      identifying, by the processor, at least one of a first set of units within the data processing system to permit power optimization of, a second set of units within the data processing system to prevent power optimization of, or one or more parameters to adjust for a third set of units within the data processing system in order to address the negative condition while not causing any additional negative condition; and
   implementing, by the processor, the plurality of alternative actions in the data processing system.

2. The method of claim 1, wherein the additional negative condition is at least one of performance, reliability, temperature, or power exceeding a predetermined specification.

3. The method of claim 1, wherein determining whether the intended action will cause the additional negative condition within the data processing system comprises:
   determining, by the processor, whether current power, temperature, performance, and reliability of the data processing system are operating at predetermined power, temperature, performance, and reliability specifications for the data processing system.

4. The method of claim 1, wherein the function is a function of at least two of reliability, voltage, frequency, number of powered on-cores, power, maximum voltage swing observed, power usage, change in power, temperature, change in temperature, number of cores powered off, wake-up latency, number of wake-ups, system response, or misprediction rates.

5. The method of claim 1, wherein each of the plurality of alternative actions are an action that permits metric optimization of the first set of units within the data processing system, prevents metric optimization of the second set of units within the data processing system, or adjusts one or more parameters for the third set of units within the data processing system in order to address the negative condition while not causing any additional negative condition, wherein the one or more parameters from a group of parameters and wherein the group of parameters comprises voltage, frequency, or workload.

6. The method of claim 5, wherein the plurality of alternative actions are implemented only for a predetermined time period.

7. The method of claim 1, wherein the method is implemented in one layer of a three-dimensional (3D) integrated chip and wherein the processor monitors at least one other layer in the 3D integrated chip.

8. A computer program product comprising a non-transitory computer readable storage medium having a computer readable program stored therein, wherein the computer readable program, when executed on a computing device, causes the computing device to:
   monitor for an intended action to address a negative condition from a resource manager in a plurality of resource managers in a data processing system;
   responsive to receiving the intended action, determine whether the intended action will cause an additional negative condition within the data processing system;
   responsive to determining that the intended action will cause the additional negative condition within the data processing system, identify a plurality of alternative actions to be implemented in the data processing system that addresses the negative condition while not causing any additional negative condition, wherein the computer readable program to identify the plurality of alternative actions to be implemented in the data processing system further causes the computing device to:
      identify a function that addresses the negative condition based on the negative condition and the additional negative condition; and
      identify at least one of a first set of units within the data processing system to permit power optimization of, a second set of units within the data processing system to prevent power optimization of, or one or more parameters to adjust for a third set of units within the data processing system in order to address the negative condition while not causing any additional negative condition; and
   implement the plurality of alternative actions in the data processing system.

9. The computer program product of claim 8, wherein the additional negative condition is at least one of performance, reliability, temperature, or power exceeding a predetermined specification.

10. The computer program product of claim 8, wherein the computer readable program to determine whether the intended action will cause the additional negative condition within the data processing system further causes the computing device to:
   determine, by the processor, whether current power, temperature, performance, and reliability of the data processing system are operating at predetermined power, temperature, performance, and reliability specifications for the data processing system.

11. The computer program product of claim 8, wherein the function is a function of at least two of reliability, voltage, frequency, number of powered on-cores, power, maximum voltage swing observed, power usage, change in power, temperature, change in temperature, number of cores powered off, wake-up latency, number of wake-ups, system response, or misprediction rates.

12. The computer program product of claim 8, wherein each of the plurality of alternative actions are an action that permits metric optimization of the first set of units within the data processing system, prevents metric optimization of the second set of units within the data processing system, or adjusts one or more parameters for the third set of units within the data processing system in order to address the negative condition while not causing any additional negative condition, wherein the one or more parameters from a group of parameters and wherein the group of parameters comprises voltage, frequency, or workload.

13. An apparatus, comprising:
a processor; and
a memory coupled to the processor, wherein the memory comprises instructions which, when executed by the processor, cause the processor to:
monitor for an intended action to address a negative condition from a resource manager in a plurality of resource managers in a data processing system;
responsive to receiving the intended action, determine whether the intended action will cause an additional negative condition within the data processing system;
responsive to determining that the intended action will cause the additional negative condition within the data processing system, identify a plurality of alternative actions to be implemented in the data processing system that addresses the negative condition while not causing any additional negative condition, wherein the instructions to identify the plurality of alternative actions to be implemented in the data processing system further cause the processor to:
identify a function that addresses the negative condition based on the negative condition and the additional negative condition; and
identify at least one of a first set of units within the data processing system to permit power optimization of, a second set of units within the data processing system to prevent power optimization of, or one or more parameters to adjust for a third set of units within the data processing system in order to address the negative condition while not causing any additional negative condition; and
implement the plurality of alternative actions in the data processing system.

14. The apparatus of claim 13, wherein the additional negative condition is at least one of performance, reliability, temperature, or power exceeding a predetermined specification.

15. The apparatus of claim 13, wherein the instructions to determine whether the intended action will cause the additional negative condition within the data processing system further cause the processor to:
determine, by the processor, whether current power, temperature, performance, and reliability of the data processing system are operating at predetermined power, temperature, performance, and reliability specifications for the data processing system.

16. The apparatus of claim 13, wherein the function is a function of at least two of reliability, voltage, frequency, number of powered on-cores, power, maximum voltage swing observed, power usage, change in power, temperature, change in temperature, number of cores powered off, wake-up latency, number of wake-ups, system response, or misprediction rates.

17. The apparatus of claim 13, wherein each of the plurality of alternative actions are an action that permits metric optimization of the first set of units within the data processing system, prevents metric optimization of the second set of units within the data processing system, or adjusts one or more parameters for the third set of units within the data processing system in order to address the negative condition while not causing any additional negative condition, wherein the one or more parameters from a group of parameters and wherein the group of parameters comprises voltage, frequency, or workload.

* * * * *